US012723688B2

(12) United States Patent
Chao

(10) Patent No.: US 12,723,688 B2
(45) Date of Patent: Sep. 1, 2026

(54) TELESCOPIC PIPE STRUCTURE

(71) Applicant: K&W TOOLS CO., LTD, Nantou County (TW)

(72) Inventor: Aldous Chao, Nantou County (TW)

(73) Assignee: K&W Tools Co., Ltd., Nantou County (TW)

( * ) Notice: Subject to any disclaimer, the term of this patent is extended or adjusted under 35 U.S.C. 154(b) by 57 days.

(21) Appl. No.: 18/892,974

(22) Filed: Sep. 23, 2024

(65) Prior Publication Data

US 2026/0085776 A1 Mar. 26, 2026

(51) Int. Cl.
*F16L 27/12* (2006.01)

(52) U.S. Cl.
CPC ................................ *F16L 27/1273* (2019.08)

(58) Field of Classification Search
CPC ..... F16L 27/1273; F16L 27/12; F16L 27/127; F16L 39/04; F16L 39/06
See application file for complete search history.

(56) References Cited

U.S. PATENT DOCUMENTS 5,287,869 A * 2/1994 Wu ..................... F16L 27/1273 135/25.4
5,702,198 A * 12/1997 Kuo .................... F16L 27/1273 135/25.4
7,774,901 B1 * 8/2010 Huang ................ F16L 27/1273 16/113.1
12,115,641 B2 * 10/2024 Tulodziecki ........ F16L 27/1273
2014/0000065 A1 * 1/2014 Bukovitz ............ F16L 27/1273 403/345
2015/0089821 A1 * 4/2015 Troudt ................ F16L 27/1273 16/427
2016/0023347 A1 * 1/2016 Ho ...................... F16L 27/1273 16/429

FOREIGN PATENT DOCUMENTS

AU 6413400 A * 4/2001 .......... F16L 27/1273
GB 2544105 A * 5/2017 .......... F16L 27/1273
KR 20170141014 A * 12/2017 .............. F16L 27/12
WO WO-9935409 A1 * 7/1999 .......... F16L 27/1273

* cited by examiner

*Primary Examiner* — Matthew Troutman
*Assistant Examiner* — Fannie Kee
(74) *Attorney, Agent, or Firm* — Rosenberg, Klein & Lee

(57) ABSTRACT

A telescopic pipe structure comprises an inner pipe, an outer pipe, and an adjusting mechanism. The inner pipe is installed in a hollow portion of the outer pipe and can be displaced relative to the outer pipe to adjust the length of the telescopic pipe structure. The adjusting mechanism is mounted on the outer pipe and is used to fix the relative position between the outer pipe and the inner pipe. A protruding piece is provided on the outer surface of the inner pipe, while an inward protrusion is provided on the adjusting mechanism. When the protrusion on the adjusting mechanism contacts the protruding piece on the inner pipe, the inner pipe will be unable to elongate relative to the outer pipe, thereby preventing separation between the inner and outer pipes.

15 Claims, 8 Drawing Sheets

331
43
11
3511
45
432
21
38
42
381
20
10
12

TELESCOPIC PIPE STRUCTURE

TECHNICAL FIELD

This invention relates to a telescopic pipe structure designed to facilitate cleaning and maintenance for users, thereby enhancing convenience during use.

BACKGROUND

Telescopic pipes typically consist of an outer pipe, an inner pipe, and a positioning mechanism. The inner pipe is positioned inside the outer pipe and can be longitudinally displaced relative to the outer pipe to adjust the length of the telescopic pipe. When the telescopic pipe is adjusted to a preset length, the positioning mechanism is engaged to fix the relative positions of the outer and inner pipes, preventing them from moving relative to each other.

The positioning mechanism is typically fixed on the outer pipe. After a period of use, the interior of the positioning mechanism may accumulate dirt, such as sawdust or dust, leading to malfunction and requiring maintenance or servicing. However, conventional positioning mechanisms are not easily removable by users, forcing them to purchase new telescopic pipes and discard the old ones. This increases the cost of using telescopic pipes and contributes to environmental pollution caused by the disposal of old telescopic pipes.

SUMMARY

To address the aforementioned issues, this invention provides a telescopic pipe structure that allows users to disassemble it themselves for maintenance, cleaning, or component replacement, thereby reducing maintenance and purchase costs.

This invention provides a telescopic pipe structure comprising an outer pipe, an inner pipe, and an adjusting mechanism. The inner pipe is located within a hollow portion of the outer pipe, while the adjusting mechanism is installed on the outer pipe to fix the relative positions of the outer pipe and the inner pipe. The adjusting mechanism comprises a main body positioned at one end of the outer pipe, wherein the main body is equipped with at least one protrusion. At least one protruding piece is provided on the outer surface of the inner pipe. The protrusion on the main body interferes with the protruding pieces on the inner pipe, preventing separation between the inner and outer pipes during extension.

This invention provides a telescopic pipe structure comprising an outer pipe, an inner pipe, and an adjusting mechanism. The outer pipe is equipped with at least one fixing hole, while a main body of the adjusting mechanism is fitted with at least one through-hole. When the main body of the adjusting mechanism is attached to the outer pipe, the through-hole on the main body overlaps with the fixing hole on the outer pipe. A fitting part is used to insert into the through-hole on the main body and the fixing hole on the outer pipe, thereby securing the adjusting mechanism to the outer pipe. During disassembly, the uses are able to remove the fitting part to detach the adjusting mechanism from the outer pipe, facilitating maintenance or replacement for users.

To achieve the object, this invention provides a telescopic pipe structure, which comprises an outer pipe, an inner pipe, and an adjusting mechanism. The outer pipe comprises a hollow portion, a positioning hole, and a fixing hole, wherein the positioning hole and the fixing hole are located on the outer pipe and communicate with the hollow portion. The inner pipe comprises a plurality of adjustment holes that are disposed on the inner pipe. The inner pipe is used to insert into the hollow portion of the outer pipe and is moveable relative to the outer pipe along the hollow portion of the outer pipe. The adjusting mechanism comprises a main body, a fitting part, a clamping unit and a positioning unit. The main body comprises a sleeve hole, a connecting portion and a through-hole, wherein the sleeve hole is sleeved on the outer pipe, and the through-hole communicates with the sleeve hole. The fitting part is located in the through-hole of the main body and the fixing hole of the outer pipe to fix the main body and the outer pipe. The clamping unit is connected to the connecting portion of the main body via a shaft, and contacts the fitting part to restrict the fitting part within the through-hole of the main body and the fixing hole of the outer pipe, wherein the clamping unit is rotatable relative to the main body to operate in a clamping position or a release position. When the clamping unit is operated in the clamping position, the clamping unit will press the inner pipe through the fitting part so that the inner pipe cannot move relative to the outer pipe. When the clamping unit is operated in the release position, the fitting part will not press the inner pipe. The positioning unit is connected to the main body and comprises a positioning pin. When the positioning pin enters the positioning hole of the outer pipe and one of the adjustment holes of the inner pipe, it will lock the outer pipe and the inner pipe. When the positioning pin leaves the adjustment hole of the inner pipe, it will not lock the outer pipe and the inner pipe.

This invention provides another telescopic pipe structure, which comprises an outer pipe, an inner pipe, and an adjusting mechanism. The outer pipe comprises a hollow portion and a positioning hole, wherein the positioning hole is located on the outer pipe and communicates with the hollow portion. The inner pipe comprises at least one protruding piece and a plurality of adjustment holes. The protruding piece is located on an outer surface of the inner pipe and protrudes from the outer surface of the inner pipe, and the adjustment holes are located on the inner pipe. The inner pipe is used to insert into the hollow portion of the outer pipe and is moveable relative to the outer pipe along the hollow portion of the outer pipe. The adjusting mechanism comprises a main body, a clamping unit, and a positioning unit. The main body comprises a sleeve hole, a connecting portion and a protrusion. The sleeve hole is sleeved on the outer pipe, and the protrusion protrudes towards the sleeve hole. When the protrusion of the main body abuts the protruding piece of the inner pipe, the inner pipe is unable to extend relative to the outer pipe to prevent the inner pipe from separating from the outer pipe. The clamping unit is connected to the connecting portion of the main body via a shaft, wherein the clamping unit is rotatable relative to the main body to operate in a clamping position or a release position. When the clamping unit is operated in the clamping position, the clamping unit will press the inner pipe so that the inner pipe cannot displace relative to the outer pipe. When the clamping unit is operated in the release position, and the clamping unit will not press the inner pipe. The positioning unit is connected to the main body and comprises a positioning pin. When the positioning pin enters the positioning hole of the outer pipe and one of the adjustment holes of the inner pipe, it will lock the outer pipe and the inner pipe. When the positioning pin leaves the adjustment hole of the inner pipe, it will not lock the outer pipe and the inner pipe.

BRIEF DESCRIPTION OF THE DRAWINGS

This disclosure will become more fully understood from the detailed description given herein below for illustration only, and thus not limitative of this disclosure, wherein.

DETAILED DESCRIPTION

Figure 1:
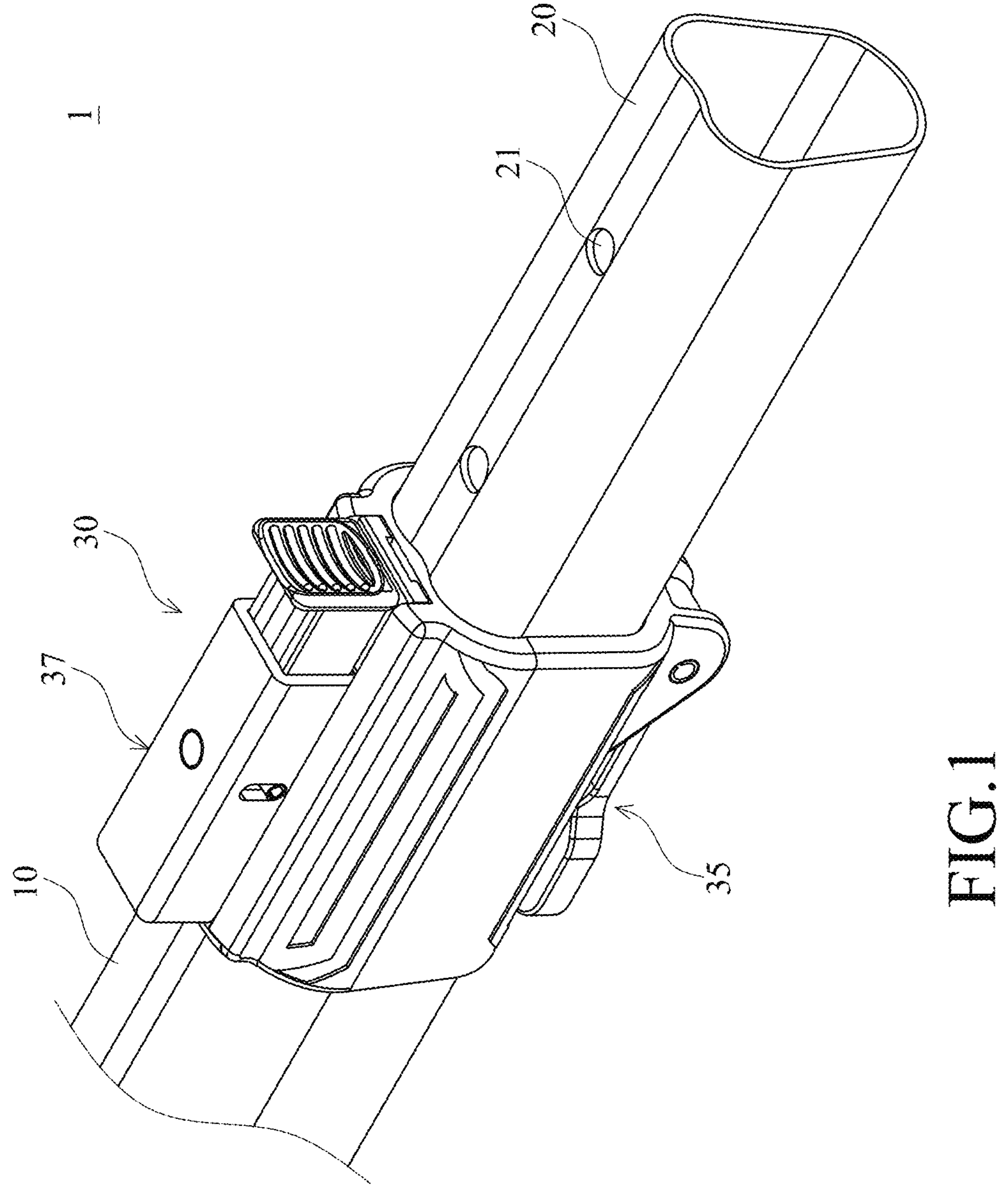
FIG. 1 is a three-dimensional view of a telescopic pipe structure according to an embodiment of the invention.
Figure 2:
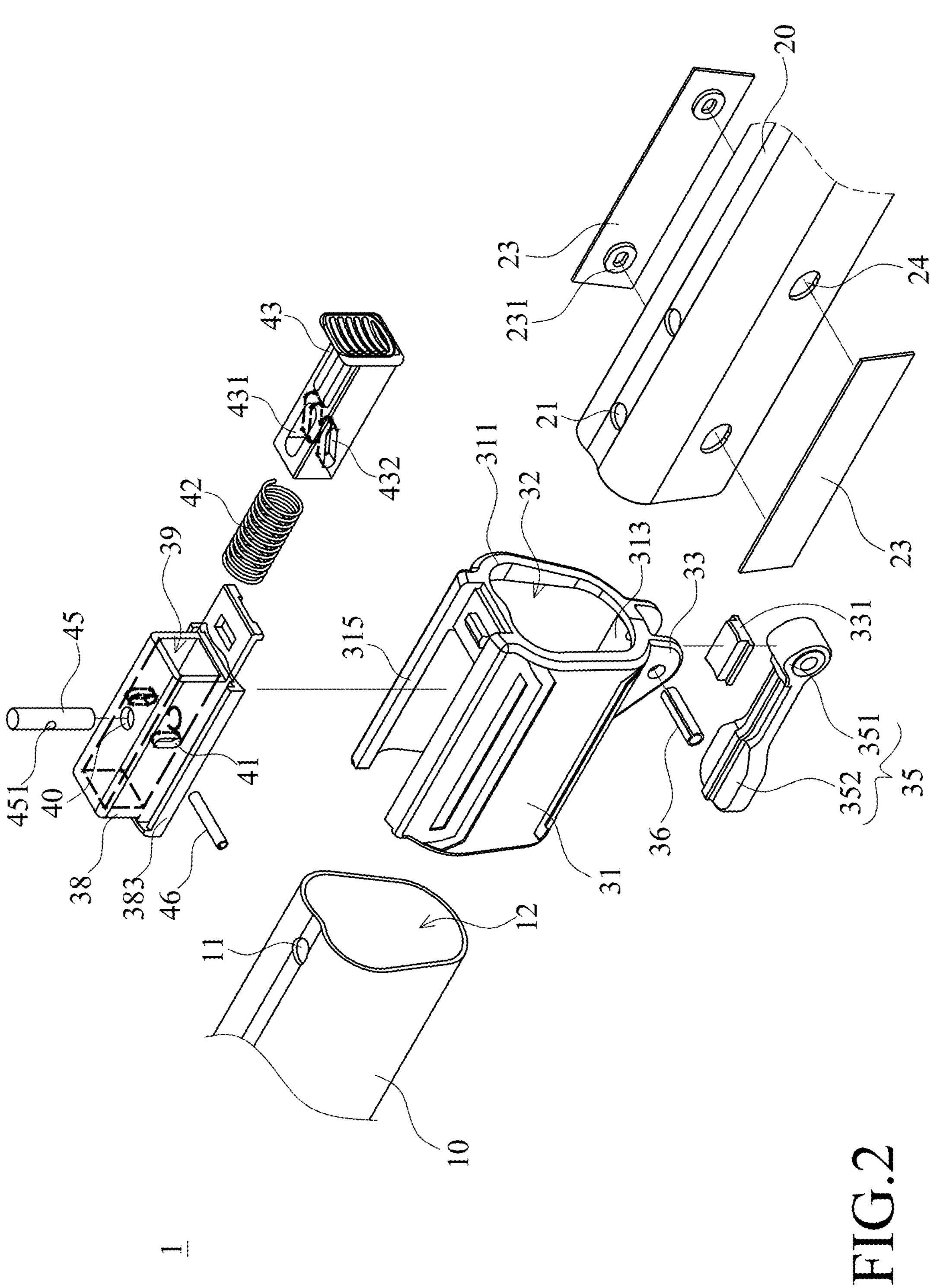
FIG. 2 is an exploded view of the telescopic pipe structure according to an embodiment of the invention.

Please refer to FIG. 1 and FIG. 2, which are respectively a three-dimensional view and an exploded view of a telescopic pipe structure according to an embodiment of the invention. The telescopic pipe structure 1 of the invention comprises an outer pipe 10, an inner pipe 20, and an adjusting mechanism 30. The outer pipe 10 is equipped with a positioning hole 11, a hollow portion 12, and a fixing hole 13. The hollow portion 12 is arranged along the axial direction of the outer pipe 10, while the positioning hole 11 and the fixing hole 13 are located on the outer pipe 10. For example, the positioning hole 11 and the fixing hole 13 may be a perforation on the surface of the outer pipe 10.

The cross-sectional area of the inner pipe 20 along the radial direction is smaller than that of the hollow portion 12 of the outer pipe 10, allowing the inner pipe 20 to be inserted into the hollow portion 12 of the outer pipe 10. The inner pipe 20 can be displaced along the axial direction of the outer pipe 10 and can extend or retract relative to the outer pipe 10 to adjust the length of the telescopic pipe structure 1.

The inner pipe 20 comprises multiple adjustment holes 21, for instance, the adjustment holes 21 can be positioned on the upper surface of the inner pipe 20 and arranged linearly along the axial direction parallel to the inner pipe 20. When the inner pipe 20 extends or retracts relative to the outer pipe 10, the multiple adjustment holes 21 on the inner pipe 20 will sequentially overlap with the positioning hole 11 on the outer pipe 10.

In the embodiment of the invention, the inner pipe 20 further comprises at least one protruding piece 23, wherein the protruding piece 23 is connected to the outer surface of the inner pipe 20 and protrudes from the outer surface of the inner pipe 20. After the protruding piece 23 is attached to the inner pipe 20, it will enter the hollow portion 12 of the outer pipe 10 together with the inner pipe 20.

In one embodiment of the invention, the protruding piece 23 and the inner pipe 20 may be two separate components, wherein the protruding piece 23 is set on the outer surface of the inner pipe 20. For example, at least one convex portion 231 can be set on one surface of the protruding piece 23, while at least one corresponding concave portion 24 is arranged on the outer surface of the inner pipe 20, wherein the concave portions 24 set on the inner pipe 20 may penetrate through the inner pipe 20. The concave portions 24 are used to accommodate the convex portions 231 of the protruding piece 23, thereby setting the protruding piece 23 on the outer surface of the inner pipe 20.

In other embodiments, the convex portion 231 may be located on the outer surface of the inner pipe 20, while the concave portion 24 may be on one surface of the protruding piece 23. Thus, the protruding piece 23 can be placed on the outer surface of the inner pipe 20.

In another embodiment of the invention, the protruding piece 23 and the inner pipe 20 may be a single component, manufactured from the same material. For example, the inner pipe 20 could be made of metal material, and the protruding piece 23 can be formed on the outer surface of the inner pipe 20 through stamping methods.

In FIG. 2, two protruding pieces 23 are respectively placed on the left and right sides of the inner pipe 20. In practical applications, the protruding pieces 23 may be positioned on the top and/or bottom sides of the inner pipe 20 as well. The position of the protruding pieces 23 on the inner pipe 20 is not a limitation of the scope of the invention.

The adjusting mechanism 30 comprises a main body 31, a clamping unit 35, and a positioning unit 37. The main body 31 includes a sleeve hole 32, a connecting portion 33, and a protrusion 311. The sleeve hole 32 of the main body 31 is used to be fitted onto the outer pipe 10. For example, the sleeve hole 32 on the main body 31 may be used to be fitted onto one end of the outer pipe 10.

Figure 3:
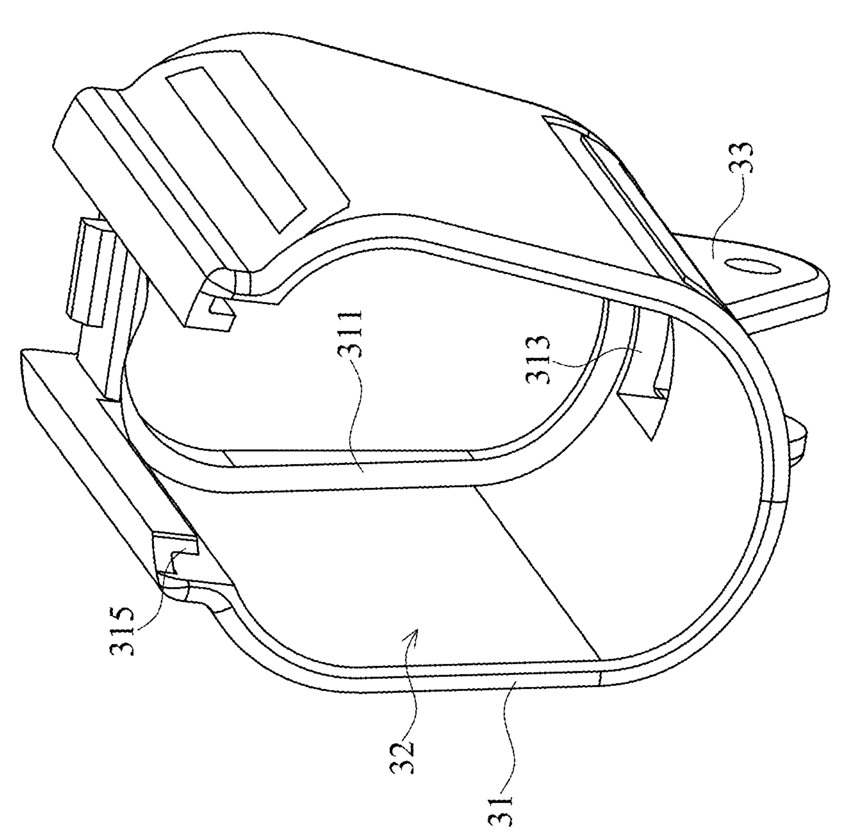
FIG. 3 is a three-dimensional view of a main body of an adjusting mechanism of the telescopic pipe structure according to an embodiment of the invention.

As shown in FIG. 3, the protrusion 311 may be located at inner surface or one end of the main body 31 and protrudes towards the sleeve hole 32 and/or radially inward of the main body 31. When the sleeve hole 32 on the main body 31 is fitted onto one end of the outer pipe 10, the end of the outer pipe 10 will press against the protrusion 311 of the main body 31 to position the outer pipe 10 and the main body 31.

In one embodiment of the invention, the protrusion 311 may be an annular protrusion located on the inner side of the sleeve hole 32. In another embodiment of the invention, the protrusion 311 may be multiple protrusions located on the inner side of the sleeve hole 32.

During assembly, one end of the inner pipe 20, which has protruding pieces 23, can be inserted into the hollow portion 12 of the outer pipe 10, and the sleeve hole 32 of the main body 31 can be fitted onto one end of the outer pipe 10. Once the main body 31 is fixed onto the outer pipe 10, the protrusion 311 of the main body 31 will interfere with the protruding pieces 23 on the inner pipe 20. When the user pulls the inner pipe 20 out of the outer pipe 10 for a certain distance, the protrusion 311 on the main body 31 will catch onto the protruding pieces 23 on the inner pipe 20, preventing the user from further extending the inner pipe 20 to avoid separation between the inner pipe 20 and the outer pipe 10.

The connecting portion 33 is positioned on the outer surface of the main body 31 and may be located below the sleeve hole 32. The number of connecting portions 33 may be two, and they protrude from the outer surface of the main body 31. Additionally, a through-hole 313 is provided on the main body 31, which is adjacent to the connecting portions 33. An elastic sheet 331 may be placed within the through-hole 313 of the main body 31. For example, if there are two connecting portions 33, the through-hole 313 is situated between the two connecting portions 33.

The clamping unit 35 comprises a cam 351 and a handle 352, which are positioned at the two ends of the clamping unit 35, respectively. The cam 351 has a protruding portion 3511, which protrudes from the surface of the cam 351. The cam 351 of the clamping unit 35 is connected to the connecting portion 33 of the main body 31 via a shaft 36, allowing the clamping unit 35 to rotate relative to the main body 31 and operate between a clamping position and a release position.

Figure 4:
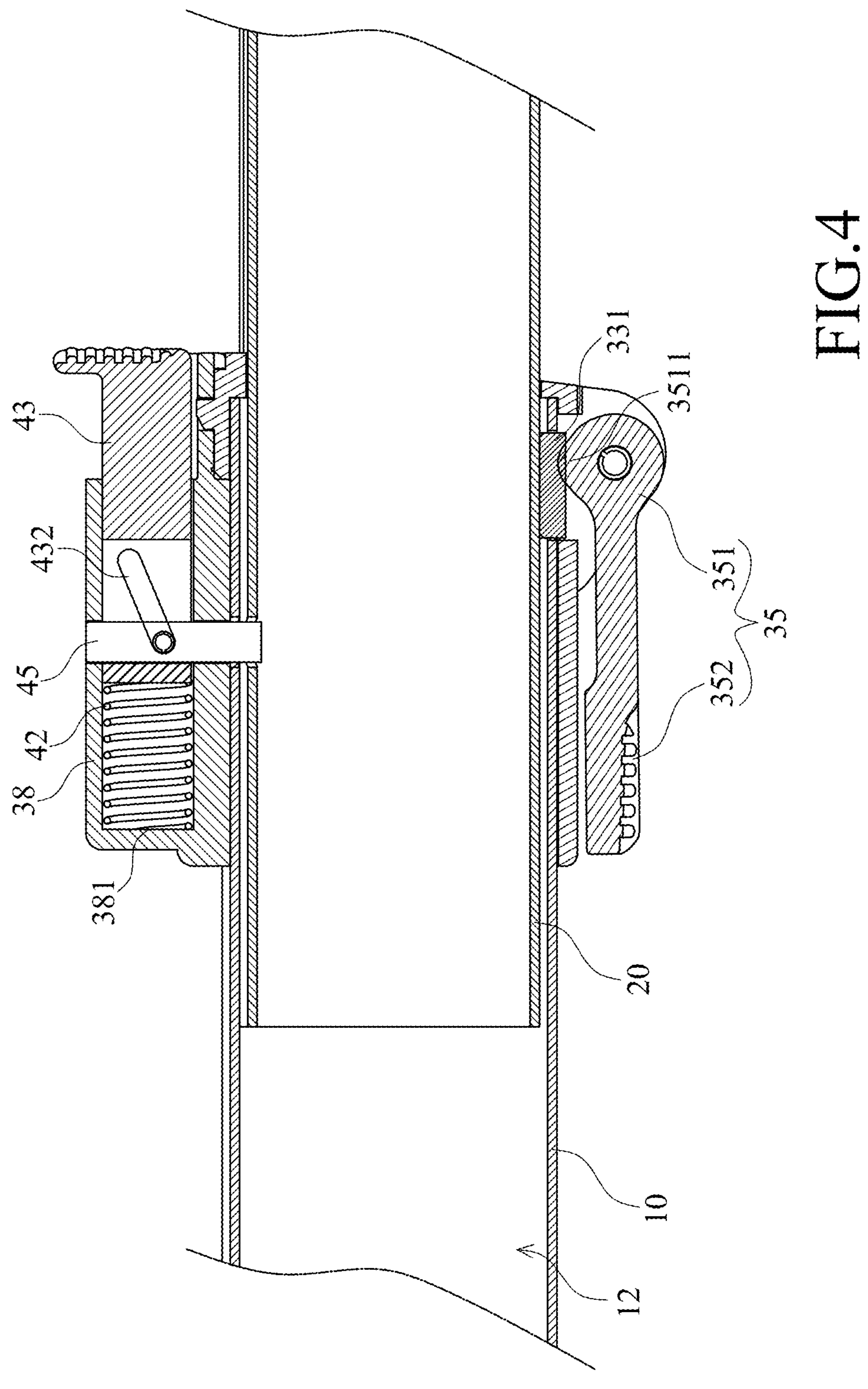
FIG. 4 is a section view of the telescopic pipe structure operation in a locked position according to an embodiment of the invention
Figure 5:
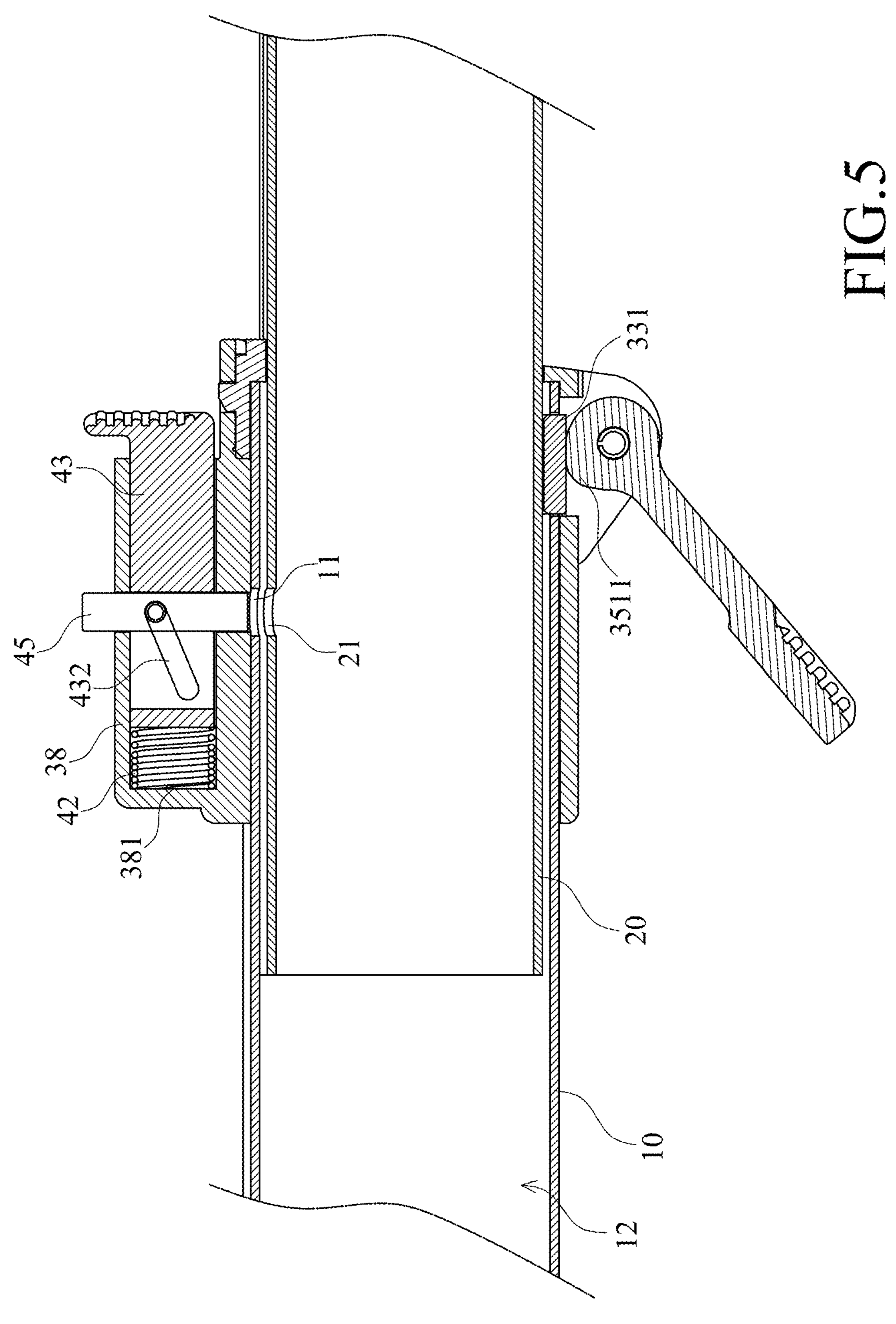
FIG. 5 is a section view of the telescopic pipe structure operation in an unlocked position according to an embodiment of the invention.

As shown in FIG. 4, when the clamping unit 35 operates in the clamping position, the protruding portion 3511 of the cam 351 will compress the elastic sheet 331, and the compressed elastic sheet 331 will press against the inner pipe 20, fixing the position between the inner pipe 20 and the outer pipe 10, preventing them from undergoing telescopic displacement. As depicted in FIG. 5, when the clamping unit 35 operates in the release position, the protruding portion 3511 of the cam 351 will not press against the inner pipe 20 through the elastic sheet 331. For example, the protruding portion 3511 may only contact the elastic sheet 331, allowing the outer pipe 10 and the inner pipe 20 to undergo telescopic displacement.

Generally speaking, the clamping unit 35 is typically used to preliminarily fix the relative positions of the outer pipe 10 and the inner pipe 20. However, if there is significant pushing or pulling force exerted between the outer pipe 10 and the inner pipe 20, there may still be extension or contraction displacement between them.

To further stabilize the relative position and length between the outer pipe 10 and the inner pipe 20, a positioning unit 37 can be installed on the main body 31 of the adjusting mechanism 30. The positioning unit 37 includes a positioning pin 45, which aligns with the positioning hole 11 of the outer pipe 10. When the positioning hole 11 of the outer pipe 10 overlaps with at least one adjustment hole 21 of the inner pipe 20, the positioning pin 45 can enter or exit the overlapping positioning hole 11 and/or adjustment hole 21.

Specifically, the positioning unit 37 and/or the positioning pin 45 can switch between locked and unlocked positions. As shown in FIG. 4, when the positioning pin 45 enters the overlapping positioning hole 11 and adjustment hole 21, the positioning unit 37 and/or the positioning pin 45 will operate in the locked position. At this point, the positioning pin 45 will get stuck in the positioning hole 11 of the outer pipe 10 and the adjustment hole 21 of the inner pipe 20, preventing the outer pipe 10 and inner pipe 20 from undergoing telescopic displacement. As shown in FIG. 5, when the positioning pin 45 leaves the positioning hole 11 and/or adjustment hole 21, the positioning unit 37 and/or the positioning pin 45 operate in the unlocked position, and the positioning pin 45 will not lock the outer pipe 10 and inner pipe 20.

In practical applications, the positioning unit 37 may have various different structures. Below, we will provide a detailed description of one such structure of the positioning unit 37. The detailed structure of the positioning unit 37 described below is merely one embodiment of the invention and is not a limitation of the scope of the invention.

As shown in FIG. 2, the positioning unit 37 comprises a case 38, a spring 42, a driving element 43, a positioning pin 45, and a pin 46. The case 38 includes a housing space 39, two through holes 40, and two guide grooves 41. The two through holes 40 may be respectively located on the upper and lower surfaces of the case 38, while the two guide grooves 41 may be respectively located on the two side surfaces of the case 38, with both the two through holes 40 and the two guide grooves 41 communicating with the housing space 39.

In one embodiment of the invention, at least one connecting mechanism may be arranged between the main body 31 and the case 38. For example, the connecting mechanism is guide rail. Two opposing first guide units 315 can be placed on the main body 31, while each side of the case 38 can have a second guide unit 383. The second guide unit 383 of the case 38 is used to connect with the first guide unit 315 of the main body 31, allowing the case 38 to slide relative to the main body 31, facilitating the user in disassembling or installing the case 38 on the main body 31. In other embodiments, the connecting mechanism may be screws, which are used to fix the case 38 on the main body 31.

When the positioning unit 37 malfunctions, users can detach the case 38 of the positioning unit 37 from the main body 31 by the connecting mechanism and replace it with a new positioning unit 37 without having to discard the entire telescopic pipe structure 1, thereby saving the maintenance cost and purchase cost of the positioning unit 37.

The spring 42 is positioned within the housing space 39 of the case 38, with one end of the spring 42 abutting against an end wall 381 of the case 38, as shown in FIG. 4. The driving element 43 is located inside the housing space 39 of the case 38, with the driving element 43 abutting against the other end of the spring 42. For example, the driving element 43 may be a push rod. The driving element 43 features a through connecting slot 431 and two sloping slots 432, with the through connecting slot 431 traversing the upper and lower surfaces of the driving element 43. The two sloping slots 432 are respectively located on the left and right surfaces of the driving element 43, and they communicate with the through connecting slot 431, with the ends of the sloping slots 432 positioned at different heights.

The positioning pin 45 is used to be placed within the two through holes 40 on the upper and lower surfaces of the case 38 and inside the through connecting slot 431 of the driving element 43, wherein the side surface of the positioning pin 45 is equipped with a via hole 451. The pin 46 is used to be placed within the two guide grooves 41 on both sides of the case 38, the sloping slots 432 on both sides of the driving element 43, and the via hole 451 of the positioning pin 45.

When the user does not apply pushing force to the driving element 43, the driving element 43 will remain in a locked position due to the action of the spring 42, as shown in FIG. 4. At this point, the pin 46 will be positioned at the lower end of the sloping slot 432 and will drive the positioning pin 45 to the positioning hole 11 of the outer pipe 10 and one of the adjustment holes 21 of the inner pipe 20, thereby locking the relative positions of the outer pipe 10 and inner pipe 20. Conversely, when an external force acts on the driving element 43 and overcomes the force of the spring 42, the driving element 43 will move to the unlocked position, as shown in FIG. 5. At this time, the pin 46 will move along the sloping slot 432 to the higher end, and will drive the positioning pin 45 to leave the adjustment hole 21 of the inner pipe 20 and/or the positioning hole 11 of the outer pipe 10.

When users need to adjust the length of the telescopic pipe structure 1, they can first switch the clamping unit 35 to the release position. Then, they can push the driving element 43 to switch it to the unlocked position as shown in FIG. 5. The driving element 43 will drive the positioning pin 45 to leave the adjustment hole 21 of the inner pipe 20 and/or the positioning hole 11 of the outer pipe 10. At this point, the inner pipe 20 and outer pipe 10 can relatively displace to adjust the length of the telescopic pipe structure 1.

After completing the length adjustment of the telescopic pipe structure 1, users can release the force applied to the driving element 43, allowing the driving element 43 to return to the locked position under the action of the spring 42. At this point, the driving element 43 will drive the positioning pin 45 to enter the positioning hole 11 of the outer pipe 10 and one of the adjustment holes 21 of the inner pipe 20, as shown in FIG. 4. Then, users can switch the clamping unit 35 to the clamping position, preventing relative displacement or sliding movement between the inner pipe 20 and outer pipe 10.

Figure 6:
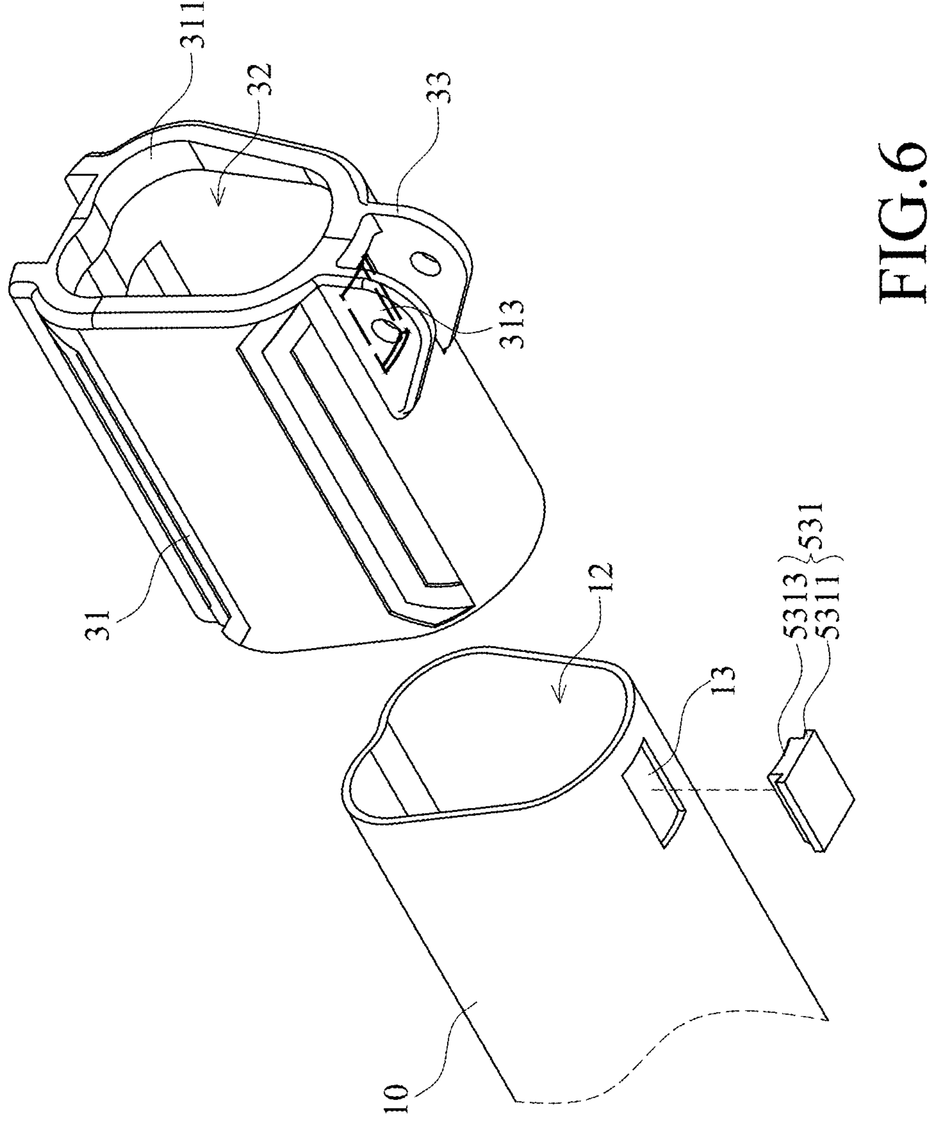
FIG. 6 is an exploded view of an outer pipe and the main body of the telescopic pipe structure according to an embodiment of the invention.
Figure 7:
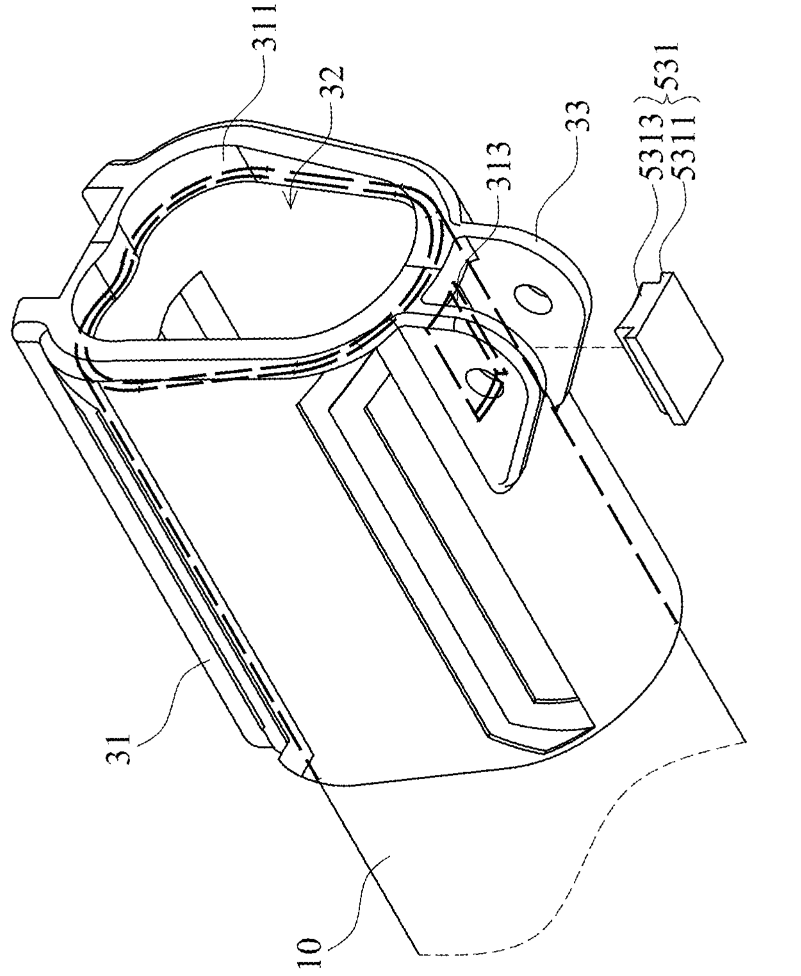
FIG. 7 is a three-dimensional view of the outer pipe and the main body of the telescopic pipe structure according to anther embodiment of the invention.

Please refer to FIG. 6 and FIG. 7, which are respectively an exploded view and a three-dimensional view of the outer pipe and the main body of the telescopic pipe structure according to an embodiment of the invention. The main body 31 comprises a through-hole 313, at least one protrusion 311, and a sleeve hole 32. The sleeve hole 32 is arranged axially along the main body 31, while the through-hole 313 is located on the surface of the main body 31 and connects to the sleeve hole 32. The protrusion 311 is located on the inner surface or at one end of the main body 31 and protrudes in the axial and/or sleeve hole 32 direction, where the inner area of the protrusion 311 is smaller than the cross-sectional area of the sleeve hole 32.

The outer pipe 10 comprises a fixing hole 13 and a hollow portion 12. The hollow portion 12 is arranged axially along the outer pipe 10, while the fixing hole 13 is located on the surface of the outer pipe 10 and connects to the hollow portion 12. The cross-sectional area of the outer pipe 10 is smaller than the cross-sectional area of the sleeve hole 32 and larger than the inner area of the protrusion 311.

When the sleeve hole 32 of the main body 31 is fitted onto one end of the outer pipe 10, the protrusion 311 of the main body 31 will abut against one end of the outer pipe 10, thereby positioning the main body 31 relative to the outer pipe 10. This ensures that the through-hole 313 on the main body 31 overlaps with the fixing hole 13 on the outer pipe 10.

Figure 8:
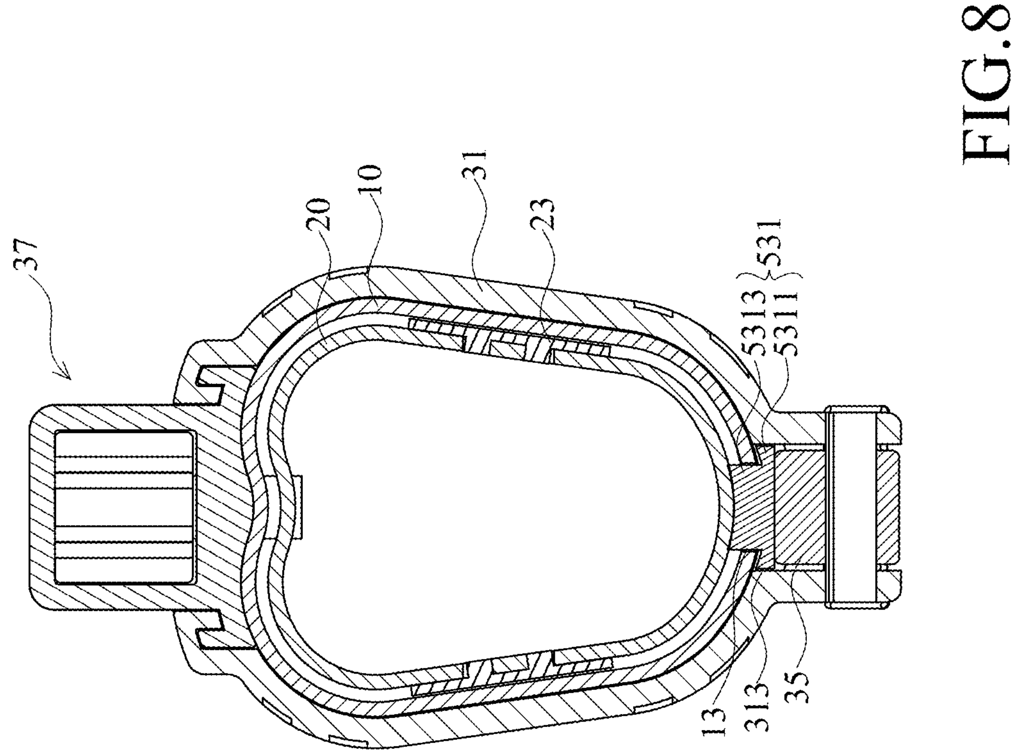
FIG. 8 is a section view of the telescopic pipe structure according to another embodiment of the invention.

As shown in FIG. 8, the fitting part 531 is used to be inserted into the through-hole 313 of the main body 31 and the fixing hole 13 of the outer pipe 10 to secure the main body 31 and the outer pipe 10. In one embodiment of the invention, the fitting part 531 comprises a base 5311 and a fixing protrusion 5313, where the fixing protrusion 5313 is located on the surface of the base 5311. The area of the base 5311 is larger than that of the fixing protrusion 5313, while the cross-sectional area of the through-hole 313 of the main body 31 is larger than that of the fixing hole 13 of the outer pipe 10.

When the fitting part 531 is inserted into the through-hole 313 of the main body 31 and the fixing hole 13 of the outer pipe 10, the fixing protrusion 5313 of the fitting part 531 will be located inside the fixing hole 13 of the outer pipe 10, while the base 5311 of the fitting part 531 will be located inside the through-hole 313 of the main body 31. Specifically, the fitting part 531 is designed to wedge into the through-hole 313 of the main body 31 and the fixing hole 13 of the outer pipe 10 to prevent separation between the main body 31 and the outer pipe 10.

As shown in FIG. 2, the through-hole 313 of the main body 31 may be adjacent to the connecting portion 33, where the clamping unit 35 is mounted on the connecting portion 33 via a shaft 36. The clamping unit 35 will make contact with or lightly press against the base 5311 of the fitting part 531, ensuring that the fitting part 531 remains in the through-hole 313 of the main body 31 and the fixing hole 13 of the outer pipe 10, and preventing relative sliding displacement between the main body 31 and the outer pipe 10.

When the clamping unit 35 rotates relative to the main body 31, the protruding portion 3511 of the cam 351 will press against the base 5311 of the fitting part 531, causing the fixing protrusion 5313 of the fitting part 531 to press against the inner pipe 20 located inside the hollow portion 12 of the outer pipe 10. This prevents the inner pipe 20 from undergoing telescopic displacement relative to the outer pipe 10.

The above description is only a preferred embodiment of this disclosure, and is not intended to limit the scope of this disclosure. Modifications should be included within the scope of the patent application of this disclosure.

What is claimed is:

1. A telescopic pipe structure, comprising:

an outer pipe having a hollow portion, a positioning hole, and a fixing hole, wherein the positioning hole and the fixing hole are located on the outer pipe and communicate with the hollow portion;

an inner pipe having a plurality of adjustment holes disposed on the inner pipe, wherein the inner pipe is inserted into the hollow portion of the outer pipe and is moveable relative to the outer pipe along the hollow portion of the outer pipe; and an adjusting mechanism comprising: including:

a main body having a sleeve hole, a connecting portion, and a through-hole, wherein the sleeve hole is sleeved on the outer pipe, and wherein the through-hole communicates with the sleeve hole;

a fitting part located in the through-hole of the main body and the fixing hole of the outer pipe to fix the main body and the outer pipe;

a clamping unit connected to the connecting portion of the main body via a shaft and contacting the fitting part to restrict the fitting part within the through-hole of the main body and the fixing hole of the outer pipe, wherein the clamping unit is rotatable relative to the main body to operate in a clamping position or a release position, wherein when the clamping unit is operated in the clamping position, the clamping unit presses the inner pipe through the fitting part whereby the inner pipe cannot move relative to the outer pipe, wherein when the clamping unit is operated in the release position, the fitting part will not press the inner pipe; and a positioning unit connected to the main body and having a positioning pin, wherein when the positioning pin enters the positioning hole of the outer pipe and a corresponding one of the plurality of adjustment holes of the inner pipe, the positioning pin locks the outer pipe and the inner pipe, and wherein when the positioning pin leaves the corresponding one of the plurality of adjustment holes of the inner pipe, the positioning pin will not lock the outer pipe and the inner pipe; and wherein the fitting part includes a base and a fixing protrusion, the fixing protrusion being connected to the base and being located within the fixing hole of the outer pipe, and the base being located within the through-hole of the main body.

2. The telescopic pipe structure according to claim 1, wherein the clamping unit contacts the base of the fitting part to restrict the fixing protrusion of the fitting part within the fixing hole of the outer pipe.

3. The telescopic pipe structure according to claim 2, wherein one end of the clamping unit has a cam that is connected to the connecting portion of the main body via the shaft, and wherein when the clamping unit is operated in the clamping position, the cam will press the inner pipe through the fitting part whereby the inner pipe cannot move relative to the outer pipe.

4. The telescopic pipe structure according to claim 1, wherein the inner pipe includes at least one protruding piece located on an outer surface of the inner pipe, wherein the at least one protruding piece protrudes from the outer surface of the inner pipe, and the main body includes at least one protrusion that protrudes towards the sleeve hole of the main body for abutting the at least one protruding piece on the inner pipe to prevent the inner pipe from separating from the outer pipe.

5. The telescopic pipe structure according to claim 4, wherein the at least one protruding piece has at least one convex portion provided on one surface of the at least one protruding piece, and wherein the outer surface of the inner pipe has at least one concave portion for accommodating the at least one convex portion of the at least one protruding piece to set the at least one protruding piece on the outer surface of the inner pipe.

6. The telescopic pipe structure according to claim 1, wherein the positioning unit has a case, a spring, and a driving element, wherein the case includes a housing space for accommodating the spring and the driving element, wherein the positioning pin is provided on the driving element, and wherein one of two ends of the spring abuts against an end wall of the case and another one of the two ends of the spring is connected to the driving element.

7. The telescopic pipe structure according to claim 6, further comprising at least one connecting mechanism arranged between the main body and the case for connecting the main body and the case.

8. The telescopic pipe structure according to claim 7, wherein the at least one connecting mechanism is a guide unit.

9. A telescopic pipe structure, comprising:

an outer pipe having a hollow portion and a positioning hole, wherein the positioning hole is located on the outer pipe and communicates with the hollow portion;

an inner pipe having at least one protruding piece and a plurality of adjustment holes, wherein the at least one protruding piece is located on an outer surface of the inner pipe and protrudes from the outer surface of the inner pipe, wherein the plurality of adjustment holes are located on the inner pipe, and wherein the inner pipe is inserted into the hollow portion of the outer pipe and is moveable relative to the outer pipe along the hollow portion of the outer pipe;

an adjusting mechanism including:

a main body having a sleeve hole, a connecting portion, and a protrusion, wherein the sleeve hole is sleeved on the outer pipe, wherein the protrusion protrudes towards the sleeve hole, and wherein when the protrusion of the main body abuts the at least one protruding piece of the inner pipe, the inner pipe is unable to extend relative to the outer pipe to prevent the inner pipe from separating from the outer pipe;

a clamping unit connected to the connecting portion of the main body via a shaft, wherein the clamping unit is rotatable relative to the main body to operate in a clamping position or a release position, wherein when the clamping unit is operated in the clamping position, the clamping unit presses the inner pipe whereby the inner pipe cannot displace relative to the outer pipe, and wherein when the clamping unit is operated in the release position, the clamping unit will not press the inner pipe; and a positioning unit connected to the main body and having a positioning pin, wherein when the positioning pin enters the positioning hole of the outer pipe and a corresponding one of the plurality of adjustment holes of the inner pipe, the positioning pin locks the outer pipe and the inner pipe, and wherein when the positioning pin leaves the corresponding one of the plurality of adjustment holes of the inner pipe, the positioning pin will not lock the outer pipe and the inner pipe;

wherein the positioning unit includes a case, a spring, and a driving element, wherein the case has a housing space for accommodating the spring and the driving element, wherein the positioning pin is provided on the driving element, and wherein one of two ends of the spring abuts against an end wall of the case and another one of the two ends of the spring is connected to the driving element.

10. The telescopic pipe structure according to claim 9, further comprising an elastic sheet located between the clamping unit and the inner pipe, wherein the clamping unit presses the inner pipe via the elastic sheet.

11. The telescopic pipe structure according to claim 10, wherein one end of the clamping unit has a cam that is connected to the connecting portion of the main body via the shaft, and wherein when the clamping unit is operated in the clamping position, the cam will press the inner pipe through the elastic sheet whereby the inner pipe cannot displace relative to the outer pipe.

12. The telescopic pipe structure according to claim 9, wherein the at least one protruding piece has at least one convex portion provided on one surface of the at least one protruding piece, and wherein the outer surface of the inner pipe had at least one concave portion for accommodating the at least one convex portion of the at least one protruding piece to set the at least one protruding piece on the outer surface of the inner pipe.

13. The telescopic pipe structure according to claim 9, further comprising at least one connecting mechanism arranged between the main body and the case for connecting the main body and the case.

14. The telescopic pipe structure according to claim 13, wherein the at least one connecting mechanism is a guide unit.

15. A telescopic pipe structure, comprising:

an outer pipe having a hollow portion and a positioning hole, wherein the positioning hole is located on the outer pipe and communicates with the hollow portion;

an inner pipe having at least one protruding piece and a plurality of adjustment holes, wherein the at least one protruding piece is located on an outer surface of the inner pipe and protrudes from the outer surface of the inner pipe, wherein the plurality of adjustment holes are located on the inner pipe, and wherein the inner pipe is inserted into the hollow portion of the outer pipe and is moveable relative to the outer pipe along the hollow portion of the outer pipe;

an adjusting mechanism including:

a main body having a sleeve hole, a connecting portion, and a protrusion, wherein the sleeve hole is sleeved on the outer pipe, wherein the protrusion protrudes towards the sleeve hole, and wherein when the protrusion of the main body abuts the at least one protruding piece of the inner pipe, the inner pipe is unable to extend relative to the outer pipe to prevent the inner pipe from separating from the outer pipe;

a clamping unit connected to the connecting portion of the main body via a shaft, wherein the clamping unit is rotatable relative to the main body to operate in a clamping position or a release position, wherein when the clamping unit is operated in the clamping position, the clamping unit presses the inner pipe whereby the inner pipe cannot displace relative to the outer pipe, and wherein when the clamping unit is operated in the release position, the clamping unit will not press the inner pipe; and a positioning unit connected to the main body and having a positioning pin, wherein when the positioning pin enters the positioning hole of the outer pipe and a corresponding one of the plurality of adjustment holes of the inner pipe, the positioning pin locks the outer pipe and the inner pipe, and wherein when the positioning pin leaves the corresponding one of the plurality of adjustment holes of the inner pipe, the positioning pin will not lock the outer pipe and the inner pipe; and wherein the at least one protruding piece has at least one convex portion provided on a surface of the at least one protruding piece and wherein the outer surface of the inner pipe has at least one concave portion for accommodating the at least one convex portion of the at least one protruding piece to set the at least one protruding piece on the outer surface of the inner pipe.

* * * * *